(12) United States Patent
Kim

(10) Patent No.: US 6,829,628 B2
(45) Date of Patent: Dec. 7, 2004

(54) RANDOM NUMBER GENERATION METHOD AND SYSTEM

(75) Inventor: Jason Seung-Min Kim, San Jose, CA (US)

(73) Assignee: PortalPlayer, Inc., Santa Clara, CA (US)

( * ) Notice: Subject to any disclaimer, the term of this patent is extended or adjusted under 35 U.S.C. 154(b) by 636 days.

(21) Appl. No.: 09/847,982

(22) Filed: May 2, 2001

(65) Prior Publication Data

US 2002/0165888 A1 Nov. 7, 2002

(51) Int. Cl.[7] .................................................. G06F 1/02
(52) U.S. Cl. ....................................................... 708/254
(58) Field of Search ................................. 708/250–256

(56) References Cited

U.S. PATENT DOCUMENTS

| | | | | |
|---|---|---|---|---|
| 5,258,936 A | * | 11/1993 | Gallup et al. | 708/254 |
| 5,335,275 A | * | 8/1994 | Millar et al. | 380/214 |
| 6,104,810 A | * | 8/2000 | DeBellis et al. | 380/43 |
| 6,502,116 B1 | * | 12/2002 | Kelly et al. | 708/250 |
| 6,535,988 B1 | * | 3/2003 | Poisner | 713/500 |

* cited by examiner

Primary Examiner—D. H. Malzahn
(74) Attorney, Agent, or Firm—David Jaffer; Pillsbury Winthrop LLP

(57) ABSTRACT

A random number generation system and method use the randomness in hardware circuitry start-up to generate a random seed for a random number. In a preferred embodiment, the instability of a phase locked loop is used.

18 Claims, 3 Drawing Sheets

RANDOM NUMBER GENERATION METHOD AND SYSTEM

BACKGROUND OF THE INVENTION

This invention relates generally to a method and system for generating a random number for a computing device.

As is well known, it is not truly possible to generate a random number using a computing device, such as a microprocessor or computer. In particular, a computer cannot perform a computation to generate a pure random number. There are well known techniques for generating pseudo-random numbers in which some form of mathematical equation is used to simulates a randomness of a number sequence. To make the result of the equation (which is known) random, most pseudo-random number generators use a well known random seed which provides a random time offset so that other people may know the mathematical equation that is being used, but do not know the random seed being used. One technique for generating a random seed may take advantage of random user input, such as random key strikes or random mouse movements, in order to generate the random seed. This technique obviously requires the user to actively do something to generate the random seed. It would be preferably to provide an automatic method for generating a random seed that is, in fact, random.

Thus, it is desirable to provide a random number generation system and method and it is to this end that the present invention is directed.

SUMMARY OF THE INVENTION

The random number generation system in accordance with the invention overcomes the above problem with a generation of a random seed by utilizing randomness of physical world properties, such as impurities of hardware components and environmental irregularities of a individual system—in terms of temperature, voltage and manufacturing process. In particular, when a computer system is first manufactured, the circuits are in different random states depending on various factors. The important point is that no human being has any idea of the state of the circuitry at start-up and the path it takes to get to a known state. Therefore, in accordance with the invention, the randomness of the circuitry may be used to automatically generate a random seed that may be used in turn to generate a pseudo-random or random number.

In the preferred embodiment, most computer systems have a well known phase locked loop (PLL) which is designed to lock onto a reference clock signal. However, during the start-up or reset of the computer system, the PLL will overshoot and undershoot the clock frequency as the PLL counter attempts to lock onto the proper clock frequency. The time it takes and the number of overshoots and undershoots for the PLL to lock onto that reference clock frequency is largely un-deterministic due to the individual characteristics of electronic components and various composition and environmental states of electronic circuits during the powering up process. Consequently, the time that it takes for the PLL to lock onto the clock frequency is known as $t_{SETTLE}$ and is a random time period. In accordance with the invention, the time that it takes the PLL to lock onto the clock frequency and the number of clock ticks the PLL generated during this time of instability may be used as a random seed that is then used to generate a pseudo-random number in accordance with the invention. In addition, the PLL in the computer may be forced into unstable conditions to generate a new random seed in accordance with the invention.

Thus, in accordance with the invention, a random number generator is provided that comprises an electrical circuit that has an unstable state and a stable state which it settles into after a random period of time, a counter that determines the number of PLL ticks that it took for the electrical circuit to settle into the stable state and a generator that generates a random number using the settle time as the random seed. A random number generation method is also provided.

In accordance with another aspect of the invention, a random seed generator is provided that comprises an electrical circuit that has an unstable state and a stable state which it settles into after a random period of time and a counter that determines the time that it takes for the electrical circuit to settle into the stable state wherein the settle time corresponds to a random seed for generating a random number. A method for generating a random seed is also provided.

In accordance with yet another aspect of the invention, a computer system that generates a random number is provided. The computer system comprises a phase locked loop circuit that has an unstable state and a stable state that it enters after some random period of time, a counter for determining the period of time for the phase locked loop to settle into the stable state, the settle time corresponding to a random seed, and a generator for applying the random seed to a random number generator in order to generate a random number.

DETAILED DESCRIPTION OF THE PREFERRED EMBODIMENT

The invention is particularly applicable to a microprocessor-based random number generation systems and it is in this context that the invention will be described. It will be appreciated, however, that the random number generation system in accordance with the invention has greater utility, such as to other systems that has an electrical circuit.

Figure 1:
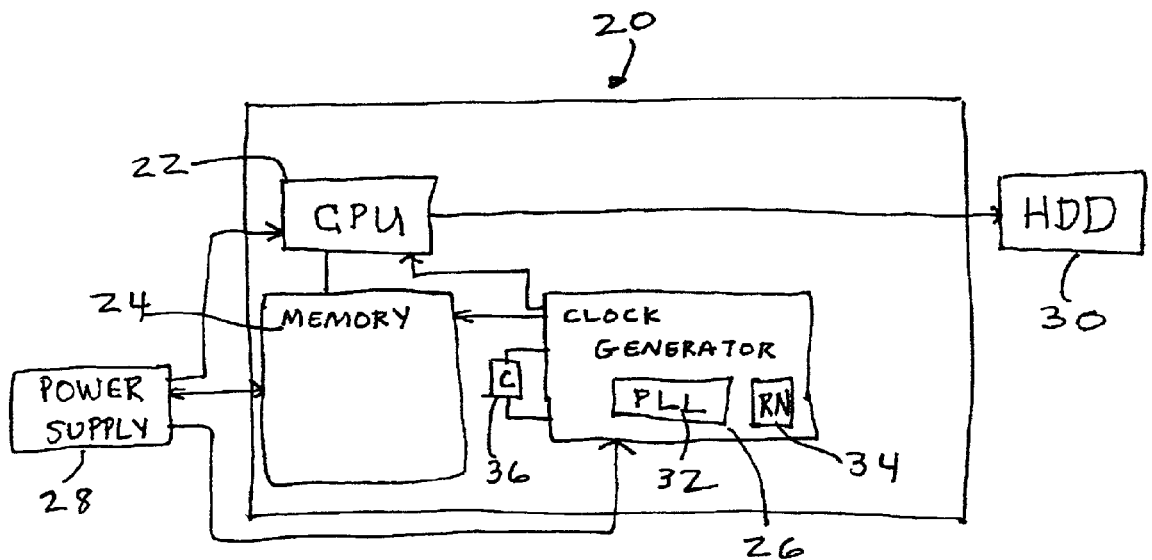
FIG. 1 is a diagram illustrating a typical computer system including a random number generator in accordance with the invention.

FIG. 1 is a diagram illustrating a typical computer system 20 including a random number generator in accordance with the invention. In particular, the computer system may typically include a central processing unit (CPU) 22, a memory 24, a clock generator 26 as well as a power supply 28 and a persistent storage device 30, such as a hard disk drive. The operation of the computer system and these elements are well known and will not be described here. In addition, the computer system may contain other well known elements which are not shown in the diagram. The computer system may further include a phase lock loop (PLL) 32 and a random number generator (RN) 34. The PLL, as is well known, is used to lock onto the frequency of the clock or a clock crystal 36. The clock generator may then provide the locked onto clock signal to the various elements of the computer system including the memory 24 and the CPU 22. The RN 34 may be a piece of software code located in memory or on a semiconductor device that is executed to generate the random number. The RN 34 may also include a counter (not shown) for determining the settle time of the PLL.

When the computer system 20 is powered up (e.g., the power supply is attached to the computer system and is supplying a voltage to the computer system such as by plugging the computer system into a wall socket, attaching a battery to the computer system or powering up the computer system with the battery attached), the state of the various electrical circuitry in the computer system are unknown and random. For example, each circuit, such as the PLL, is made up of hundreds or thousands of semiconductor transistors whose state is unknown at power-up. In particular, the state of each transistor upon power-up is unknown since the electric charge and electrons residing in each transistor at power up is unknown. This unknown state of the electrical circuitry in the computer system can be used, in accordance with the invention, to provide a random seed for the random number generator 34 as will be described.

Figure 2:
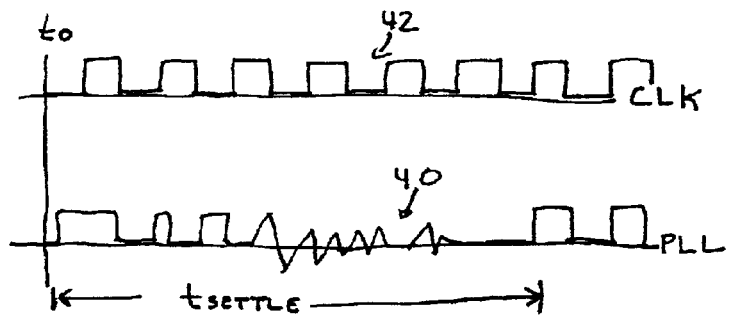
FIG. 2 is a diagram illustrating the typical behavior of a phase locked loop.

FIG. 2 is a diagram illustrating the typical behavior of a phase locked loop. In particular, at time $t_0$, when the computer system is powered up, the PLL signal 40 overshoots and undershoots the appropriate clock frequency 42 as shown for some period of time. In fact, due to the unknown states of the circuits that form the PLL, the time period during which the PLL is not locked onto the clock frequency is a random number that depends on the unknown states of the electrical circuitry. This random period of time for the PLL to lock onto the clock frequency, known as $t_{SETTLE}$, may be used in accordance with the invention as the random seed to generate a pseudo-random number in accordance with the invention. In a preferred embodiment of the invention, the random seed is the number of clock ticks that are accumulated during the settle period of the PLL. In more detail, the random seed is computed by counting the number of meta-stable switching clocks (which is random) during the settling time. Other implementations of the random seed generation in accordance with the invention may also be within the scope of the invention.

Figure 3:
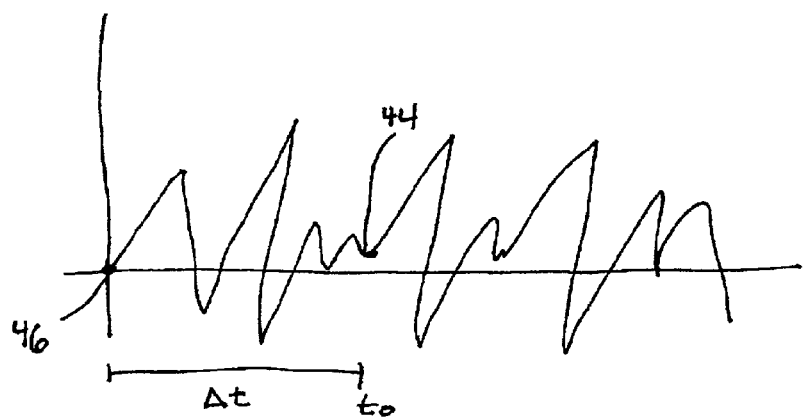
FIG. 3 is a diagram illustrating a typical mathematical equation used for the generation of a random number.

FIG. 3 is a diagram illustrating a typical mathematical equation used for the generation of a random number. In particular, the mathematical equation can be graphed as shown and, if the mathematical equation is determined, then the value of the random number at any time can be easily determined. However, in order to generate a random number from the mathematical equation, a random seed is used. The random seed effectively provides an unknown, random time offset, $\Delta t$, so that, at time $t_0$, a value 44 of the equation is different from a second value 46 of the equation if the time were not offset. In this manner, although the mathematical equation may be known or discovered, the random seed prevents someone from easily discovering the value of the random number since they would need to discover both the mathematical equation as well as the random seed. In accordance with the invention, a novel technique for generating a random seed and hence a random number is now described.

Figure 4:
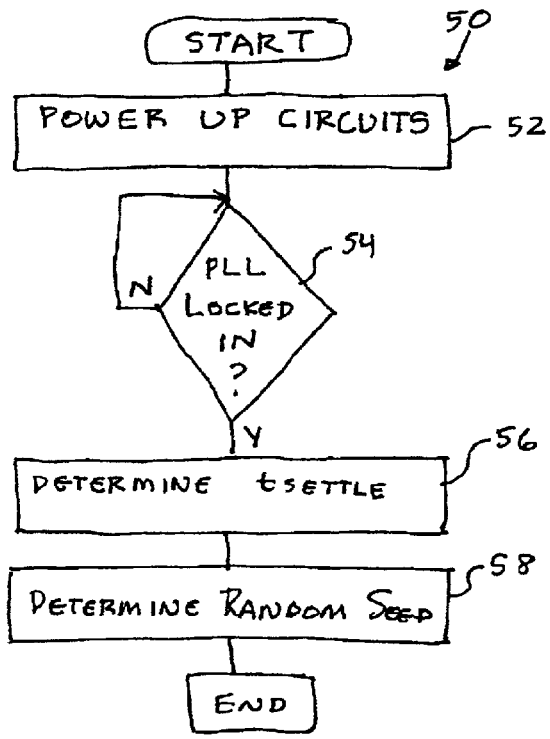
FIG. 4 illustrates a method for generating a random number and random seed in accordance with the invention during the start-up of a computer system.

FIG. 4 illustrates a method 50 for generating a random number and random seed in accordance with the invention during the start-up of a computer system. In step 52, the computer system is powered up such that the states of the electrical circuitry are unknown. In step 54, the method determines if the PLL has locked into the clock frequency and continues to check if it has not yet locked in. When the PLL has locked into the frequency, the method determines the value of $t_{SETTLE}$ in step 56 which is the random time that is took for the PLL to lock onto the clock frequency. In step 58, the value of the random seed that is used to generate a pseudo-random number is made equal to $t_{SETTLE}$. Thus, using the randomness of the settling time of the PLL which is a function of the randomness of the circuitry, a pseudo-random number may be generated in accordance with the invention. Now, a method for generating a random number during the normal operation of the computer system will be described.

Figure 5:
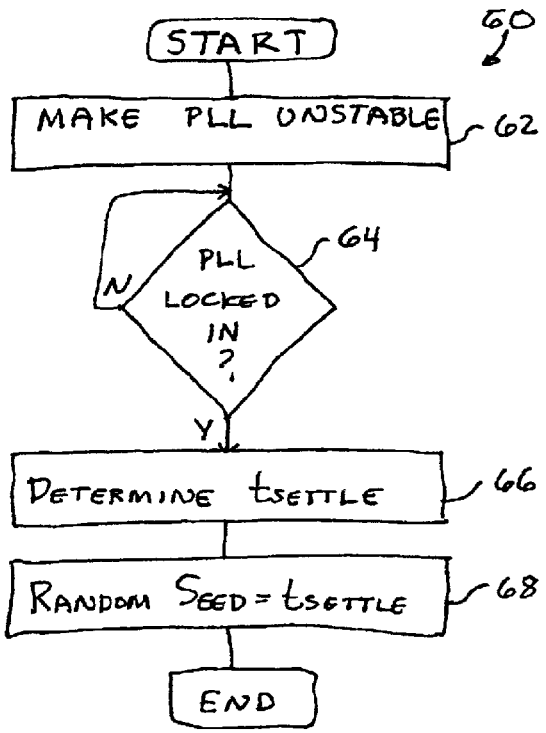
FIG. 5 illustrates a method for generating a random number and random seed in accordance with the invention during the operation a computer system.

FIG. 5 illustrates a method 60 for generating a random number and random seed in accordance with the invention during the operation a computer system. In particular, in step 62, the PLL of the computer system can be forced into an unstable situation in which the PLL will attempt to re-lock onto the appropriate clock frequency. Thus, as above, whether the PLL is locked in is determined in step 64 and then $t_{SETTLE}$ is determined in step 66. In step 68, the new value of $t_{SETTLE}$ is used as the new random seed for the random number generation. In this manner, the random number used by the computer system may be reset at any time using this method.

Figure 6:
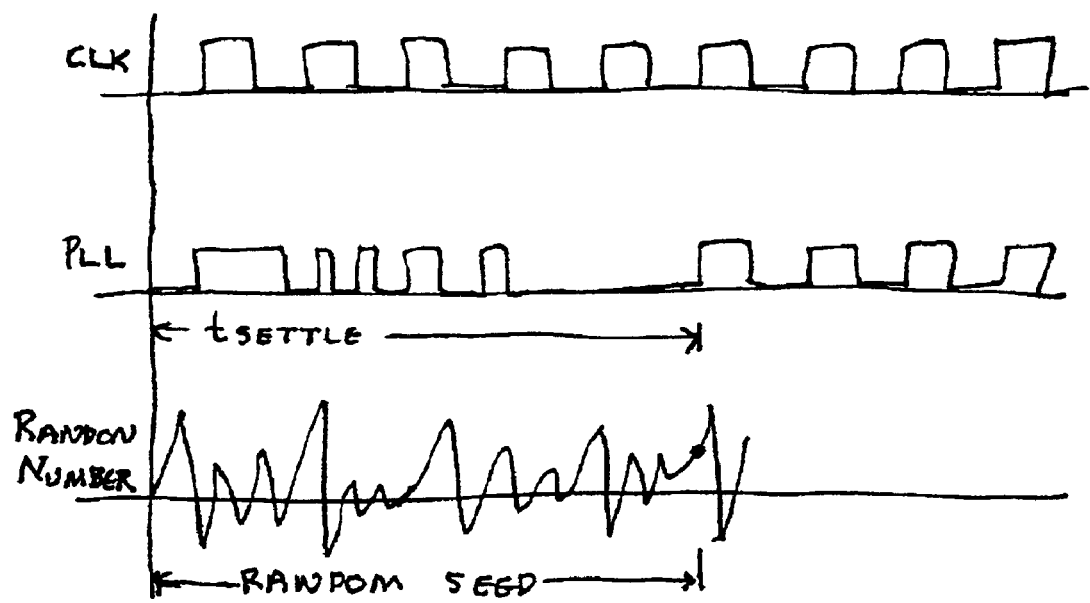
FIG. 6 illustrates the generation of a random seed in accordance with the invention.

FIG. 6 illustrates the generation of a random seed in accordance with the invention wherein the value of $t_{SETTLE}$ is used at the random seed as shown. Thus, even if the mathematical equation is discovered, the random seed is unknown and cannot be easily determined so that the random number cannot be easily determined. In accordance with the invention, any method or technique for generating the pseudo-random number may be used. In addition, any type of mathematical equation may be used to generate the pseudo-random number.

In summary, the invention permits the random seed and hence the random number in a computer system to be generated based on the unknown states of the electrical circuitry within the computer system. In the preferred embodiment, the uncertainty in the PLL electrical circuitry may be used to generate a random seed.

While the foregoing has been with reference to a particular embodiment of the invention, it will be appreciated by those skilled in the art that changes in this embodiment may be made without departing from the principles and spirit of the invention, the scope of which is defined by the appended claims.

What is claims is:

1. A random number generator, comprising an electrical circuit that in response to an applied electrical signal, initially has an unstable state and settles into a stable state after a random period of time; a counter that determines the time that it takes for the electrical circuit to settle into the stable state; and a generator that generates a random number using the random period of time as a random seed.

2. The generator of claim 1, wherein the electrical circuit responds to said electrical signal when initially non-operating to cause said circuit to begin operation.

3. The generator of claim 2, wherein the electrical signal is applied during operation of the electrical circuit.

4. The generator of claim 2, wherein the electrical circuit comprises a phase locked loop.

5. The generator of claim 4, wherein the counter further comprises a counter that counts a number of meta-stable clock ticks of the phase locked loop during the random period of time and wherein the random seed comprises the number of meta-stable clock ticks of the phase locked loop during the random period of time.

6. A random number generation method, comprising:
   providing an electrical circuit that in response to an applied electrical signal, initially has an unstable state and settles into a stable state after a random period of time;
   counting the time that it takes for the electrical circuit to settle into the stable state; and
   generating a random seed based on the random period of time of the electrical circuit.

7. The method of claim 6 further comprising applying said electrical signal to the electrical circuit while the electrical circuit is operating.

8. The method of claim 6 further comprising applying said electrical signal to the electrical circuit while said electrical circuit is operating in order to generate a new random seed.

9. A random seed generator, comprising:
   an electrical circuit that in response to an applied electrical signal initially has an unstable state and settles into a stable state after a random period of time; and
   a counter that determines the time that it takes for the electrical circuit to settle into the stable state wherein data corresponding to the random period of time is used by said generator as a random seed for generating a random number.

10. The generator of claim 9, wherein the electrical circuit is non-operating prior to application of said signal.

11. The generator of claim 9, wherein the electrical signal is applied during the operation of the electrical circuit in order to generate a new random seed.

12. The generator of claim 10, wherein the electrical circuit comprises a phase locked loop.

13. The generator of claim 12, wherein the counter further comprises a counter that counts a number of meta-stable clock ticks of the phase locked loop during the random period of time and wherein the random seed comprises the number of meta-stable clock ticks of the phase locked loop during the random period of time.

14. A random seed generation method, comprising:
   providing an electrical circuit that in response to an applied electrical signal, initially has an unstable state and settles into a stable state after a random period of time; and
   counting the random time that it takes for the electrical circuit to settle into the stable state wherein data corresponding to the random period of time is used by said generator as a random seed for generating a random number.

15. The method of claim 14 further comprising applying said electrical signal to the electrical circuit while said electrical current is not operating.

16. The method of claim 14 further comprising applying said electrical signal to the electrical circuit when said electrical circuit is operating to cause and electrical circuit to enter into an unstable state during the operation of the electrical circuit in order to generate a new random seed.

17. A computer system that generates a random number, comprising:
   a phase locked loop circuit that upon application of an electrical signal enters into an unstable state and after a random period of time enters into a stable state;
   a counter for determining the random period of time and wherein said computer system uses data corresponding to said random period of time as a random seed; and
   a generator for applying the random seed to a random number generator in order to generate a random number.

18. The computer system of claim 17, wherein the counter further comprises a counter that counts the a number of meta-stable clock ticks of the phase locked loop during the random period of time of the phase locked loop and wherein the random seed comprises the number of meta-stable clock ticks of the phase locked loop during the random period of time.

* * * * *